United States Patent
Fujita (10) Patent No.: US 11,503,436 B2
(45) Date of Patent: Nov. 15, 2022

(54) RADIO COMMUNICATION SYSTEM, BASE STATION, MOBILE STATION, AND RADIO COMMUNICATION METHOD

(71) Applicant: KYOCERA Corporation, Kyoto (JP)

(72) Inventor: Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 32 days.

(21) Appl. No.: 17/133,809

(22) Filed: Dec. 24, 2020

(65) Prior Publication Data

US 2021/0152981 A1 May 20, 2021

Related U.S. Application Data

(63) Continuation of application No. PCT/JP2019/024934, filed on Jun. 24, 2019.

(30) Foreign Application Priority Data

Jun. 27, 2018 (JP) .............................. JP2018-122517

(51) Int. Cl.
*H04W 4/06* (2009.01)
*H04W 4/44* (2018.01)
*H04W 76/11* (2018.01)

(52) U.S. Cl.
CPC ............. *H04W 4/06* (2013.01); *H04W 4/44* (2018.02); *H04W 76/11* (2018.02)

(58) Field of Classification Search
CPC .............. B60W 30/143; B60W 30/182; G08G 1/0116; G08G 1/0141; H04W 4/02; H04W 4/06; H04W 4/44; H04W 76/11

USPC .......................................... 370/235, 252, 312
See application file for complete search history.

(56) References Cited

U.S. PATENT DOCUMENTS

2019/0061755 A1* 2/2019 Chen .................. B60W 30/143

FOREIGN PATENT DOCUMENTS

JP        2002-243466 A     8/2002
WO    WO-2019121537 A1 *  6/2019

OTHER PUBLICATIONS

ARIB STD-T109 Version 1.3 published on Jul. 27, 2017.

* cited by examiner

*Primary Examiner* — Harun Chowdhury
(74) *Attorney, Agent, or Firm* — Studebaker & Brackett PC (57) ABSTRACT

A radio communication method includes: broadcasting a communication packet including application data regarding to a road and identification indicating a first type of a road corresponding to the application data, by a base station provided around the road. The radio communication method includes receiving the communication packet from the base station, by a mobile station installed on a vehicle. The radio communication method includes specifying a second type of the road on which the vehicle installed the mobile station travels, by the mobile station. The radio communication method includes acquiring the application data included in the received communication packet, when the first type of the road indicated by the identification information included in the received communication packet and the specified second type of the road match.

9 Claims, 9 Drawing Sheets

RADIO COMMUNICATION SYSTEM, BASE STATION, MOBILE STATION, AND RADIO COMMUNICATION METHOD

RELATED APPLICATIONS

The present application is a continuation based on PCT Application No. PCT/JP2019/024934, filed on Jun. 24, 2019, which claims the benefit of Japanese Patent Application No. 2018-122517 filed on Jun. 27, 2018. The content of which is incorporated by reference herein in their entirety.

TECHNICAL FIELD

The present invention relates to a radio communication system, base station, mobile station, and radio communication method for an intelligent transport system.

BACKGROUND ART

Recently, an intelligent transport system (ITS: Intelligent Transport System) is payed attention as a technology possible to avoid risk of a traffic accident. In this circumstance, the standards of a radio communication system including a base station installed at a roadside and a mobile station installed on a vehicle is specified in a non-patent literature 1.

The radio communication system performs road-to-vehicle communication transmitting and receiving a communication packet between a base station and mobile station and inter-vehicle communication transmitting and receiving the communication between the mobile stations. Here, in the communication packet, as a destination address (destination MAC address), a broadcast address is only specified. That is, the road-to-vehicle communication and inter-vehicle communication are performed by broadcast communication (broadcast). Therefore, when the mobile station receives the communication packet from the base station, the mobile station acquires application data included in received all the communication packets.

CITATION LIST

Non-Patent Literature

Non-Patent Literature 1: ARIB STD-T109 version 1.3, "700 MHz BAND INTELLIGENT TRANSPORT SYSTEMS"

SUMMARY OF THE INVENTION

A radio communication system according to a first disclosure, includes a base station provided around a road and a mobile station which is installed on a vehicle and performs radio communication with the base station. The base station includes a transmitter configured to transmit a communication packet including application data regarding to the road. The communication packet includes identification information indicating a first type of the road corresponding to the application data. The mobile station includes a receiver configured to receive the communication packet from the base station, and a controller configured to specify a second type of the road on which the vehicle installed the mobile station travels. The controller is configured to acquire the application data included in the received communication packet, when the first type of the road indicated by the identification information included in the received communication packet and the specified second type of the road match.

A base station according to a second disclosure is provided around a road and performs communication with a mobile station installed on a vehicle. The base station includes a transmitter configured to broadcast a communication packet including application data regarding to the road. The communication packet includes identification information indicating a type of the road corresponding to the application data.

A mobile station according to a third disclosure is installed in a vehicle and performs communication with a base station provided around a road, and the mobile station includes a receiver configured to receive a communication packet, the communication packet including application data regarding to the road is broadcasted; and a controller configured to specify a second type of the road on which the vehicle installed the mobile station travels. The communication packet includes identification information indicating a first type of the road corresponding to the application data. The controller is configured to acquire the application data included in the received communication packet, when the first type of the road indicated by the identification information included in the received communication packet and the specified second type of the road match.

A radio communication method according to a fourth disclosure includes broadcasting a communication packet including application data regarding to a road and identification data indicating a first type of the road corresponding to the application data, by a base station provided around the road; receiving the communication packet from the base station, by a mobile station installed on a vehicle; specifying a second type of the road on which the vehicle installed the mobile station travels, by the mobile station; and acquiring the application data included in the received communication packet, when the first type of the road indicated by the identification included in the received communication packet and the specified second type of the road match, by the mobile station.

DESCRIPTION OF EMBODIMENTS

It is assumed that a base station installed for a general road provides application data for the general road, for example, information regarding to a traffic signal, information regarding to a crossing, or the like.

On the other hand, it is assumed that a base station installed for a highway provides application data for the highway, for example, information regarding to a highway tollgate or the like.

However, in a case where the general road and highway are provided with both to a horizontal direction or vertical direction, a radio wave of the base station installed for the general road reaches to the highway, and a mobile station installed on the vehicle travelling the highway can acquire the application data for the general road. Similarly, a radio wave of the base station installed for the highway reaches to the general road, and a mobile station installed in a vehicle travelling the general road can acquire the application data for the highway. In this case, there are concerns that the acquired application data will not only be wasted, but also may cause an unexpected error.

The present disclosure provides a radio communication system, base station, mobile station, and radio communication method possible to process adequately an operation regarding to an intelligent transport system.

It will be described with reference to the drawings about a radio communication system according to an embodiment. Further, in the following description of the drawings, same or similar parts are marked with same or similar signs.

System Configuration

Figure 1:
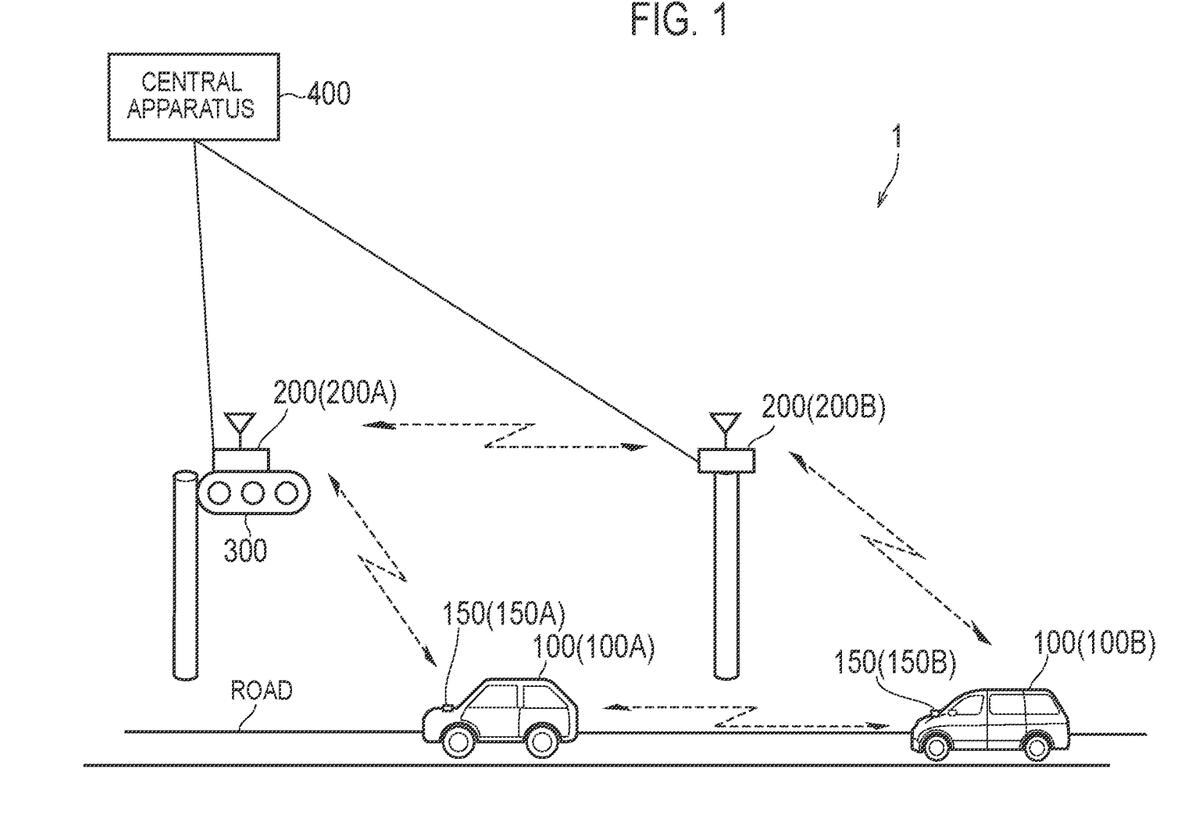
FIG. 1 is a diagram illustrating a radio communication system according to an embodiment.

FIG. 1 is a diagram illustrating a radio communication system 1 according to a present embodiment. The radio communication system 1 is a radio communication system based on the standard of the Non-Patent Literature 1.

As illustrated in FIG. 1, the radio communication system 1 includes a plurality of vehicles 100, and a plurality of base stations 200. In FIG. 1, vehicles 100A and 100B are exemplified as the plurality of vehicles 100 and base stations 200A and 200B are exemplified as the plurality of base stations 200. Further, though an ordinary automobile, light automobile, or the like are exemplified as the vehicles 100, it may be any vehicle travelling to a road, for example, two-wheeled vehicle (automatic motorcycle) or the like.

A mobile station 150 performing radio communication by the CSMA (Carrier Sense Multiple Access) scheme is installed in each of the vehicles 100. Further, the mobile station 50 may be referred to as an onboard device or onboard communication device. Details of the mobile station 150 will be described in later.

Each of the base stations 200 is provided near a road. Further, each of the base stations 200 is connected to a central apparatus 400 via a communication channel. The base station 200 may be provided on every intersection of a general road or provided at roadside of highway. The base station 200 may be referred to as a roadside apparatus or roadside communication apparatus. The base station 200A is provided on a traffic signal 300 or an its support. The base station 200A operates in cooperation with the traffic signal 300. The base station 200A may transmit a communication packet including information regarding to the traffic signal 300 (lighting color switching information or the like) as application data. Details of the base station 200 will be described in later.

The radio communication system 1 performs road-to-vehicle communication transmitting and receiving a communication packet between the base station 200 and mobile station 150 (vehicle 100), and inter-vehicle communication transmitting and receiving the communication packet between the mobile stations 150 (between the vehicles 100). Further, the radio communication system 1 may perform road-road communication transmitting and receiving the communication packet between the base stations 200. Radio communication is used in each of the road-to-vehicle communication, inter-vehicle communication, and road-road communication. It will be described about the road-to-vehicle communication mainly in the present embodiment.

Each of the base stations 200 is connected to the central apparatus 400 via the communication channel. A vehicle detector provided at the roadside may be connected to the central apparatus 400 via the communication channel.

The central apparatus 400 receives, from each of the base stations 200, vehicle information including position of the vehicle 100, speed, or the like which the base station 200 received from the mobile station 150 (application data). The central apparatus 400 may receive vehicle detection information from a roadside sensor provided at each of the roads, further. The central apparatus 400 collects and processes various types of traffic information based on the received information, integrates a traffic transport system, and manages. For example, the central apparatus 400 transmits a control indication indicating lighting color switching for the traffic signal 300 or transmits traffic information including traffic congestion information or the like (application data) to the base station 200.

Communication Protocol Stack

Figure 2:
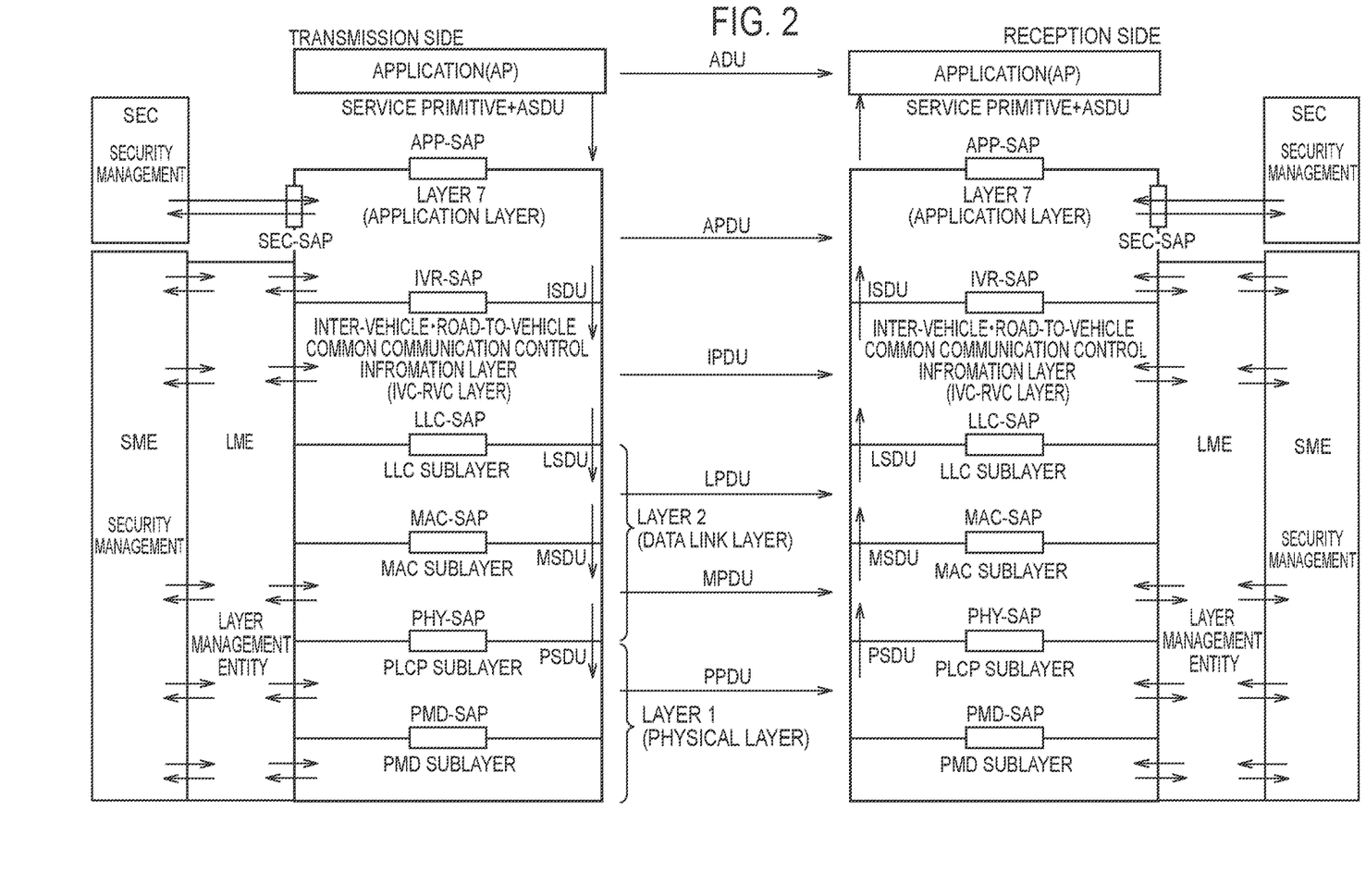
FIG. 2 is a diagram illustrating a communication protocol stack in a radio communication system according to an embodiment.

FIG. 2 is a diagram illustrating a communication protocol stack in the radio communication system 1 according to the present embodiment. The communication protocol stack illustrated in FIG. 2 is applied to each of the road-to-vehicle communication, inter-vehicle communication, and road-road communication.

As illustrated in FIG. 2, each layer of the communication protocol stack is defined based on the OSI Reference Model. The communication protocol stack includes a Layer 1 (L1, Physical layer), Layer 2 (L2, Data Link Layer), Inter-Vehicle•Road-to-Vehicle common communication control information (IVC-RVC: Inter-Vehicle Communication-Road to Vehicle Communication) Layer, and Layer 7 (L7, Application Layer).

The Layer 1 operates in conformity to the physical layer specified in the IEEE802.11.

The Layer 2 includes a MAC (Medium Access Control) sublayer and LLC (Logical Link Control) sublayer. The MAC sublayer may be referred to as a MAC layer merely, and the LLC sublayer may be referred to as LLC layer merely. The MAC layer uses the CSMA/CA scheme as communication control between the mobile stations 150. The MAC layer performs frame control and broadcast communication (broadcast) as communication management of a radio channel. The LLC layer provides connectionless-type service to perform packet transmission between entities of an upper layer.

The Layer 7 provides a communication control means to an application AP. The application AP gives application data stored in a transmitted communication packet (traffic information, vehicle information, or the like) to the Layer 7, and acquires the application data stored in the received communication packet from the Layer 7.

As application of the base station 200, application which performs of acquisition and generation of application data (traffic information•vehicle information or the like) provided to the mobile station 150 or another base station, and transmits its application data by the communication control means provided by the Layer 7 is included. Further, as the application of the base station 200, application which acquires the application data (traffic information•vehicle information or the like) received from the mobile station 150 or the other base station by the communication control means provided by the Layer 7, processes, or transfers is included.

As application of the mobile station 150, application which performs of acquisition and generation of application data (traffic information•vehicle information or the like) provided to another mobile station or the base station 200, and transmits its application data by the communication control means provided by the Layer 7 is included. Further, as the application of the mobile station 150, application which acquires the application data (traffic information•vehicle information or the like) received from the other mobile station or the base station 200 by the communication control means provided by the Layer 7, processes, or transfers is included.

Road-to-Vehicle Communication Period

Figure 3:
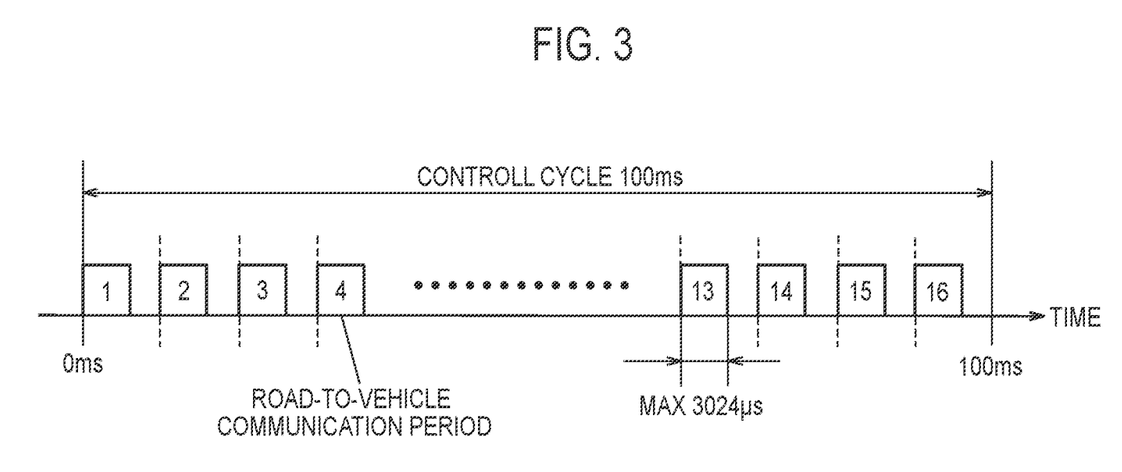
FIG. 3 is a diagram illustrating an example of a road-to-vehicle communication period in a radio communication system according an embodiment.

FIG. 3 is a diagram illustrating an example of a road-to-vehicle communication period in the radio communication system 1 according to the present embodiment.

As illustrated in FIG. 3, the base station 100 and the mobile station 150 performs communication in 100 ms cycle basically. The base station 200 secures own transmission time by notifying transmission time as own transmission information and road-to-vehicle communication period information (number of transfers•road-to-vehicle communication period length) to its surrounding the mobile stations 150. Further, it is said that synchronization accuracy of ±16 μs or less is to be kept between the mobile stations 150.

The mobile station 150 performs transmission at a timing other than transmission time period of the base station 200, by time synchronizing based on the transmission time received from the base station 200 and stopping own transmission based on the road-to-vehicle communication period information.

"16 μs" is a control unit time (unit) in a control cycle of 100 ms, and the control cycle is configured by 6250 units. A maximum value of the number of the road-to-vehicle communication period possible to set in the one control cycle is "16", and it is arranged at 390 units (6240 μs) interval from the beginning of the control cycle. A maximum value of the road-to-vehicle communication period length possible to set is 189 units (3024 μs).

Configuration of Base Station

Figure 4:
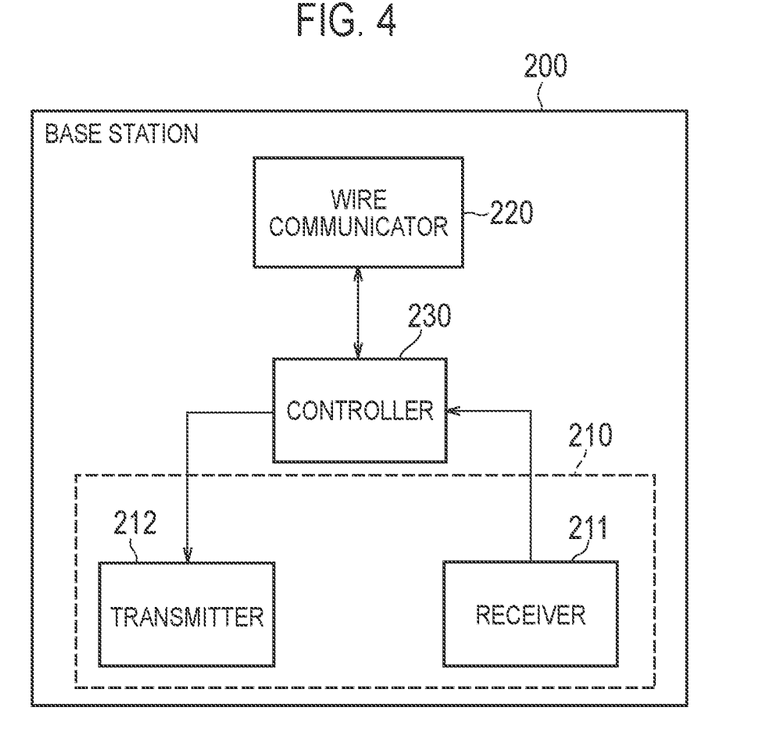
FIG. 4 is a diagram illustrating a base station according to an embodiment.

FIG. 4 is a diagram illustrating a configuration of the base station 200 according to the present embodiment. As illustrated in FIG. 4, the base station 200 includes a radio communicator 210 and wire communicator 220, and controller 230.

The radio communicator 210 is used for radio communication with the mobile station 150 and radio communication with another base station. The radio communicator 210 includes a receiver 211 and transmitter 212. The receiver 211 receives a radio signal under control of the controller 230. The receiver 211 includes an antenna, converts the radio signal received from the antenna into a baseband signal (receiving signal), and outputs to the controller 230. The transmitter 212 transmits a radio signal under control of the controller 230. The transmitter 212 includes an antenna, converts a baseband signal (transmission signal) outputted from the controller 230 into a radio signal, and transmits it from the antenna. Further, the radio communicator 210 includes an antenna with directivity along with direction of a road. The radio communicator 210 may perform an adaptive array control (beamforming, null-steering) by a plurality of antenna elements.

The wire communicator 220 is used for communication with the central apparatus 300. Further, the wire communicator 220 may be connected to the traffic signal 300.

The controller 230 performs various types of controls in the base station 200. The controller 230 includes one processor at least and one memory at least. The memory stores a program executed by the processor and information used for process by the processor. The processor may include a baseband processor and CPU. The baseband processor performs modulation and demodulation of a baseband signal, encoding and decoding, and so on. The CPU executes the program stored in the memory and performs various type of processes.

For example, the controller 230 stores temporarily vehicle information (application data) included in a communication packet which the receiver 211 receives from the mobile station 150, and transfers to the central apparatus 400 via the wire communicator 220. Further, the controller 230 stores temporarily traffic information (application data) or the like which the wire communicator 220 receives from the central apparatus 400, and transmits by broadcast a communication packet including the traffic information from the transmitter 212.

Configuration of Mobile Station

Figure 5:
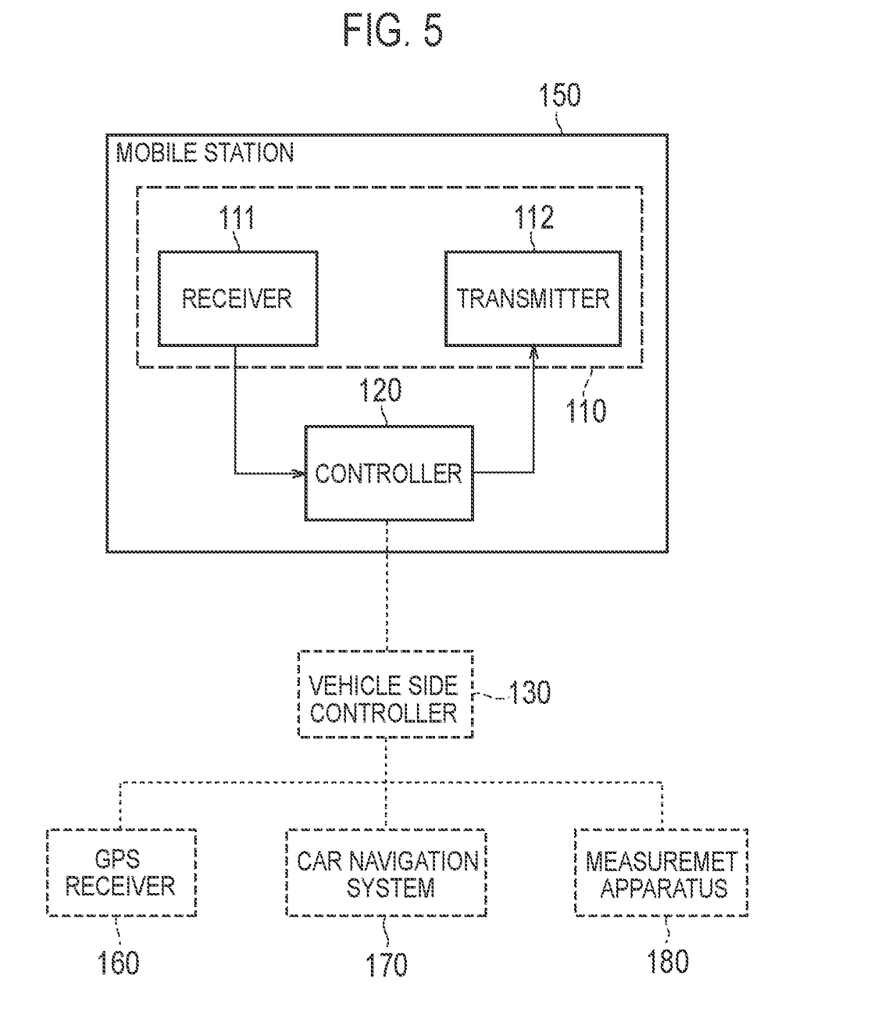
FIG. 5 is a diagram illustrating a mobile station according to an embodiment.

FIG. 5 is a diagram illustrating the mobile station 150 according to the present embodiment. As illustrated in FIG. 5, the mobile station 150 includes a radio communicator 110 and controller 120.

The radio communicator 110 is used for radio communication with the base station 200 and radio communication with another mobile station. The radio communicator 110 includes a receive 111 and transmitter 112. The receiver 111 receives a radio signal under control of the controller 120. The receiver 111 includes an antenna, converts the radio signal received by the antenna into a baseband signal (receiving signal), and outputs to the controller 120. The transmitter 112 transmits a radio signal under control of the controller 120. The transmitter 112 includes an antenna, converts the baseband signal (transmission signal) output from the controller 120 into a radio signal, and transmits it from the antenna.

The receiver 111 performs a carrier sense. Concretely, the receiver 111 monitors a reception level of a predetermined carrier frequency all times, does not perform radio transmission when the reception level is equal to or more than a threshold value, and the transmitter 112 performs the radio transmission only when the reception level is less than the threshold value.

The controller 120 performs various type controls of the mobile station 150. The controller 120 incudes one processor at least and one memory at least. The memory stores a program executed by the processor and information used for a process by the processor. The processor may include a baseband processor and CPU. The baseband processor performs modulation and demodulation of the baseband signal, encoding and decoding, and so on. The CPU executes the program stored in the memory and performs various type processes.

The controller 120 causes a communication packet including vehicle information (application data) including a current position, direction, speed of the vehicle 100 (mobile station 150), and so on to be transmitted by broadcast to outside via the radio communicator 110.

Further, the controller 120 can perform safety drive assist control to avoid right turn collision, crossing collision, or the like based on the vehicle information (application data) included in the communication packet received by the receiver 111 from another vehicle.

Further, when the receiver 111 receives time slot allocation information transmitted by broadcast by the base station 200, the controller 120 generates a communication frame including the allocation information, transmits by broadcast a radio signal of the communication frame, and transfers the allocation information to another mobile station. Further, the controller 120 performs radio communication by a carrier sense scheme at a time zone when the base station 200 transmitted the allocation information does not perform transmission.

The controller 120 may perform communication with a vehicle side controller 130 installed in the vehicle 100. The vehicle side controller 130 includes one processor at least and one memory at least. The vehicle side controller 130 may acquire information from a GPS receiving device 160, car navigation system 170, and measurement device 180 installed in the vehicle 100, and provide the acquired information to the controller 120 of the mobile station 150.

The GPS receiving device 160 acquires GPS position information indicating a geographic position of the vehicle 100 (mobile station 150) based on a signal received from a GPS satellite. The GPS position information may include altitude in addition to latitude, and longitude. The GPS receiving device 160 is included in the mobile station 150, and the controller 120 of the mobile station 150 may acquire the GPS position information from the GPS receiving device 160 directly.

The car navigation system 170 has map information, and manages a travelling root of the vehicle 100 based on the GPS position information. The car navigation system 170 may perform notification to a driver, warning, or the like based on application data which the mobile station 150 acquired by the road-to-vehicle communication or the inter-vehicle communication. The vehicle side controller 130 and car navigation system 170 may realize semi-automatic operation or full-automatic operation by controlling driving of the vehicle 100 based on the application data and measurement information from the measurement device 180.

The measurement device 180 includes a speed meter measuring speed of the vehicle 100. The measurement device 180 may include an imaging apparatus acquiring image information as measurement information.

An Example of Road Arrangement

Figure 6:
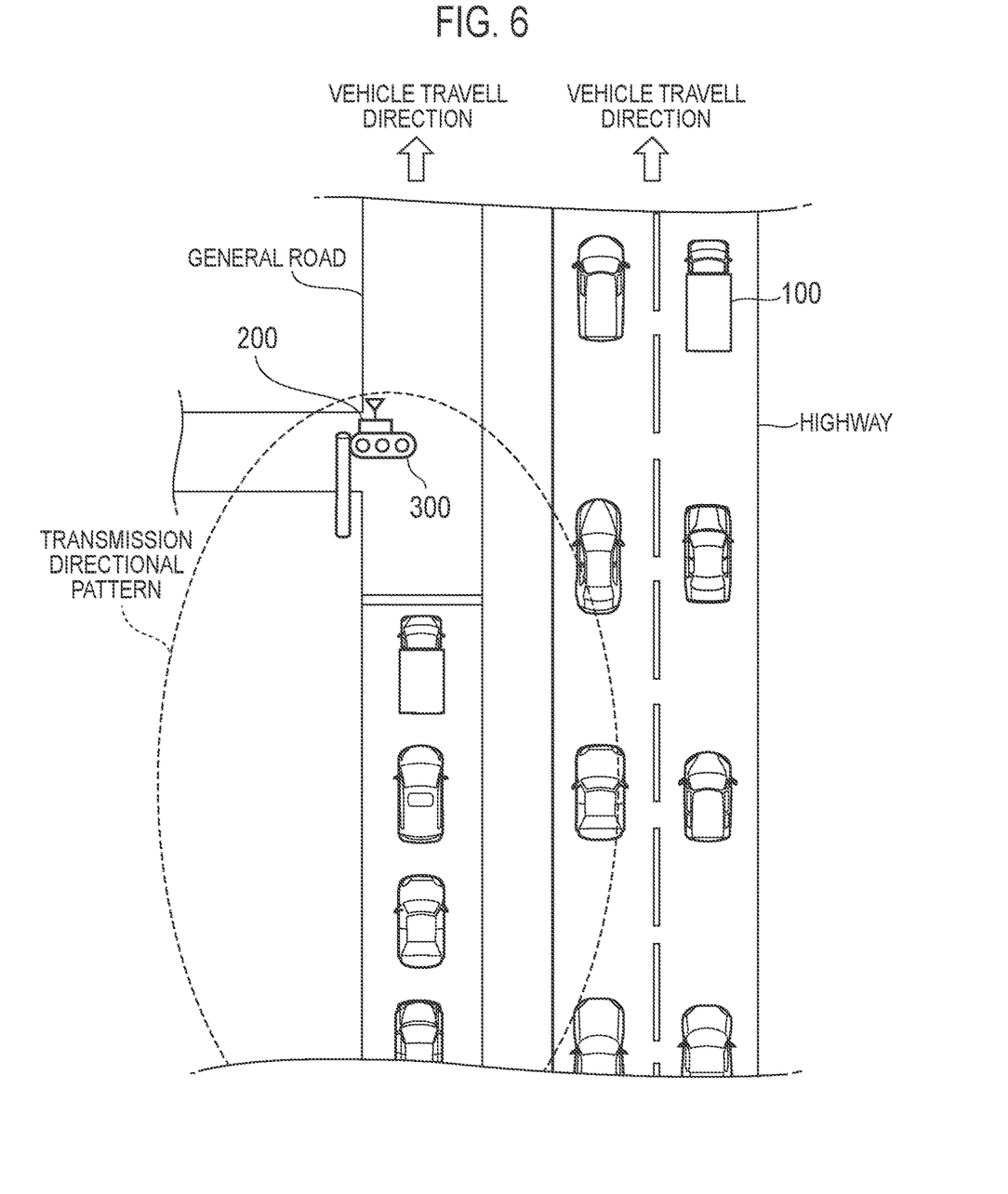
FIG. 6 is a diagram illustrating an example of road arrangement.

FIG. 6 is a diagram illustrating an example of road arrangement. In FIG. 6, a view of the road arrangement around the base station 200 is illustrated from above.

As illustrated in FIG. 6, the traffic signal 300 is installed at a roadside of a general road, and the base station 300 is provided on the traffic signal 300. In FIG. 6, it is assumed that the general road and a highway is one-way traffic and each of the vehicles travels from a lower side to an upper side of FIG. 6, for convenience for explanation. The base station 200 forms a transmission directivity pattern extending along with the general road. The base station 200 transmits a communication packet including application data for the general road, for example, information regarding to the traffic signal 300. The highway is provided next to the general road. A part of the transmission directivity pattern of the base station 200 arrives inside of the highway.

Figure 7:
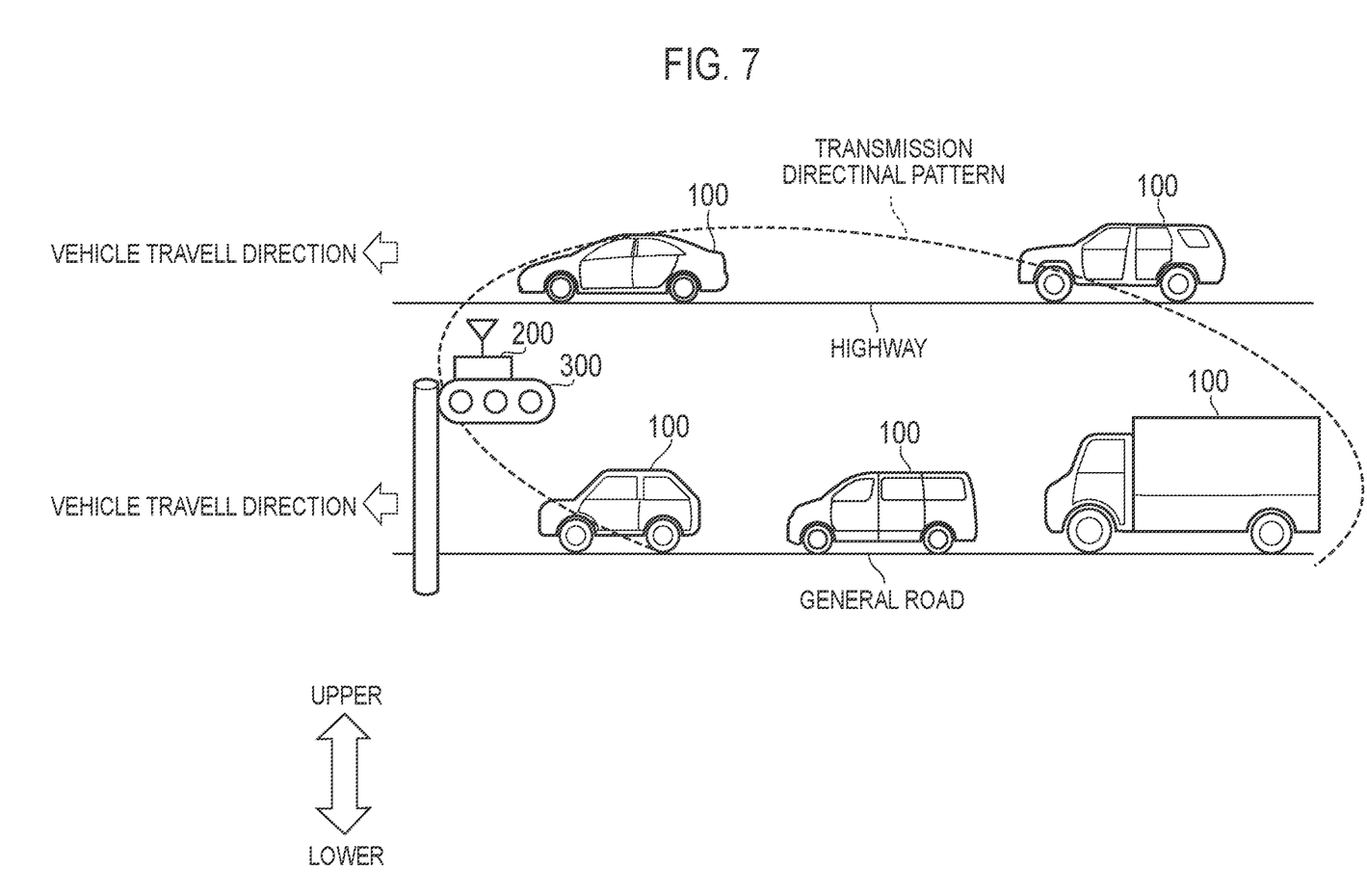
FIG. 7 is a diagram illustrating another example of road arrangement.

FIG. 7 is a diagram illustrating another example of the road arrangement. In FIG. 7, a view of road arrangement around the base station 200 is illustrated from side.

As illustrated in FIG. 7, a highway is provided upper side of a general road. In FIG. 7, it is assumed that the general road and highway is one-way traffic and each of the vehicles travels from a right side to a left side of FIG. 7, for convenience for explanation. The base station 200 forms a transmission directivity pattern extending along with the general road. The base station 200 transmits a communication packet including application data for the general road, for example, information regarding to the traffic signal 300. A part of the transmission directivity pattern of the base station 200 arrives inside of the highway.

In the case of the road arrangement illustrated in FIG. 6 and FIG. 7, a part of vehicles travelling the highway receives the communication packet which the base station 200 at the roadside of the general road broadcasts, and the mobile station 150 installed on the vehicle can acquire the application data for the general road included in the communication packet.

In this case, there are concerns that the acquired application data will not only be wasted, but also may cause an unexpected error. For example, there is possibility that a part of the vehicles travelling the highway notifies or warns to a driver about existence of the traffic signal 300 ahead, in an extreme case, the vehicle travelling the highway reduces the speed or stops according to that the traffic signal 300 is stop color (red color).

Further, it is described about the example that the vehicle (mobile station 150) travelling the highway receives the application data for the general road, however vice versa.

Configuration of Communication Packet

Figure 8:
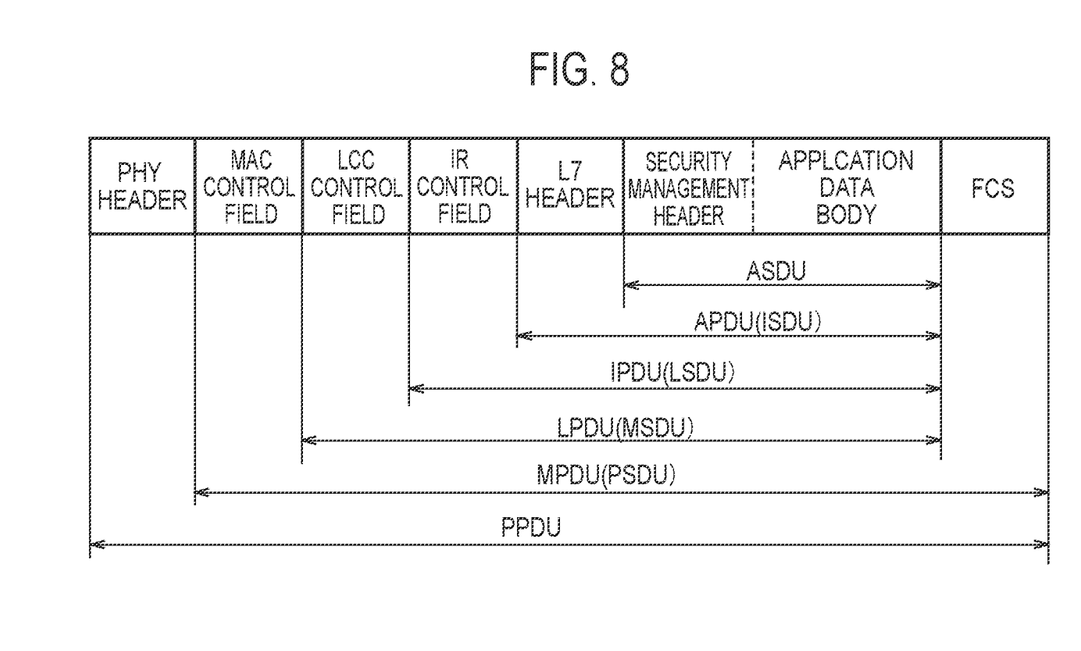
FIG. 8 is a diagram illustrating a configuration example of a communication packet according to an embodiment.

FIG. 8 is diagram illustrating a configuration example of a communication packet transmitted by radio by the base station 200 and mobile station 150 according to the present embodiment. It will be described with reference to FIG. 2 about the configuration example of the communication packet according to the present embodiment.

As illustrated in FIG. 8, the communication packet includes a PHY header (physical header), MAC control filed (MAC header), LLC control field, IR control field, Layer 7 (L7) header, application data (ASDU), and FCS. An entire communication packet including the PHY header is a PPDU (PHY Protocol Data Unit).

A head of the communication packet includes the PHY header (physical header). The PHY header is added front of a MAC frame (MPDU; MAC Protocol Data Unit) acquired from the MAC layer, by the Layer 1 (physical layer) of a transmission side communication device. The PHY header is read out in the Layer 1 (physical layer) of a receiving side communication device, and is used for a communication control process in the Layer 1 of the receiving side. The MAC frame (MPDU(MAC Protocol Data Unit)) behind the PHY header may be referred to as a PSDU (PHY Service Data Unit). A configuration of the PHY header conforms to the IEEE 802.11.

Subsequently to the PHY header, the MAC control field (MAC header) is provided. The MAC control field is added front of an LLC frame (LPDU; LLC Protocol Data Unit) acquired from the LLC layer, by the MAC layer of the Layer 2 of the transmission side communication device. The MAC control field is read out in the MAC layer of the Layer 2 of the receiving side communication device, and used for a communication control process in the MAC layer of the receiving side. The LLC frame (LPDU; LLC Protocol Data Unit) behind the MAC control field may be referred to as a MSDU (MAC Service Data Unit).

The MAC control field has a destination address field and transmission source address field. A MAC address of a communication device being a transmission source is stored in the transmission source address field. A destination address is stored in the destination address field. However, as the destination address, only a broadcast address is defined. Therefore, all the base station 200 and mobile station 150 received the communication packet recognizes the communication packet as a communication packet addressed to an own station.

The LLC control filed (LLC header) subsequently to the MAC control field is added front of an IR frame (IPDU; IR Protocol Data Unit) acquired from the IVC-RVC layer, by the LLC layer of the Layer 2 of the transmission side communication device. The LLC control field is read out in the LLC layer of the Layer 2 of the receiving side communication device, and used for a communication control process in the LLC layer of the receiving side. The IR frame (IPDU; IR Protocol Data Unit) behind the LLC control field may be referred to as a LSDU (LLC Service Data Unit).

The IR control field (IR header) subsequently to the LLC control field is provided. The IR control field is added front of an AP frame (APDU; Application Protocol Data Unit), by the IVC-RVC layer of the transmission side communication device. The IR control field is read out in the IVC-RVC layer of the receiving side communication device, and used for a communication control process in the IVC-RVC layer of the receiving side. The AP frame (APDU; Application Protocol Data Unit) behind the IR control field may be referred to as an ISDU (IR Service Data Unit).

The IR control field includes a version field, identification information field, synchronization information field, reservation field, transmission time field, road-to-vehicle communication period information field, and extension area field. Identification information stored in the identification information field is used for identification of transmission source. The identification information field is a field of four-bits. Out of four-bits, a leading bit is used for identification of a transmission source, "1" is stored when the transmission source is the base station 200, and "0" is stored when the transmission source is the mobile station. Further, out of the identification information field of four-bits, other bits other than the leading bit is undefined. The reservation field (one-bit) is reserved for the future. Further, the extension area field (16 bits) of the IR control field is reserved for the future, too.

The IVC-RVC layer of the receiving side of the communication packet gives, to the Layer 7, the AP frame (APDU; ISDU) removed the IR control field from the IR frame (IPDU) of the received communication packet. Subsequently to the IR control field, the L7 header is provided. The L7 header is added front of an ASDU (Application Service Data Unit), by the Layer 7 of the transmission side communication device. The Layer 7 header is read oud in the Layer 7 of the receiving side communication device, and used for a communication control process in the Layer 7 of the receiving side.

In this way, the communication packet includes the broadcast address as the destination address, and includes the application data regarding to the road (traffic information or the like).

Further, the IR control field (IR header) of the communication packet includes the identification information field including information indicating whether the transmission source of the communication packet the base station 200 or the mobile station 150. Therefore, the mobile station 150 confirms that the transmission source of the received communication packet is the base station 200 and can acquire the communication packet from the base station 200 selectively.

Further, the communication packet may include information indicating whether the destination of the communication packet is the base station 200 or the mobile station 150. The information may be provided in a predetermined control field other than an application data body (the PHY header, MAC control field, LLC control field, IR control field, L7 header, or a security management header).

However, when the mobile station 150 acquires all the communication packet from the base station 200 to the mobile station 150, there is case where the acquired application data is wasted. As described above, when the vehicle (mobile station 150) travelling the highway acquires the communication packet which the base station 200 at the roadside of the general road broadcasts, there are concerns that the application data will not only be wasted, but also may cause an unexpected error. Similarly, when the vehicle travelling the general road (mobile station 150) acquires the communication packet which the base station 200 at the roadside of the highway broadcasts, there are concerns that the application data will not only be wasted, but also may cause an unexpected error.

Then, a communication packet according to the present embodiment includes identification information (hereinafter, referred to as "road type identification information") indicating a type of the road corresponding to application data included in the communication packet. Concretely, the road type identification information is provided in a control field other than an application data body (the PHY header, MAC control field, LLC control field, IR control field, L7 header, or a security management header). For example, the road type identification information is provided in a field (the LLC control field, IR control field, or L7 header) read out in an upper layer than the MAC layer, out of the control field.

Thereby, the mobile station 150 installed on the vehicle 100 travelling the highway can acquire the application data, only when the mobile station 150 confirms that the transmission source of the received communication packet is the base station 200 (and confirms that the destination of the communication packet is the mobile station 150) and confirms that the communication packet includes the application data for the highway based on the road type identification information.

Further, the road type identification information may be in a header of the application data, in this case, the mobile station 150 refers to the header of the application data and acquires the application data.

Further, the mobile station 150 installed on the vehicle 100 travelling the highway can ignore or discard the application data without read out (decrypt) the application data, when the mobile station 150 confirms that the communication packet includes the application data for the general road based on the road type identification information, even when the mobile station 150 confirms that the transmission source of the received communication packet is the base station 200 (and confirms that the destination of the communication packet is the mobile station 150). In this case, the mobile station 150 can avoid occurrence of processing load due to reading out of the application data.

Further, the mobile station 150 installed on the vehicle 100 travelling the general road can acquire the application data, only when the mobile station 150 confirms that the transmission source of the received communication packet is the base station 200 (and confirms that the destination of the communication packet is the mobile station 150) and confirms that the mobile station 150 confirms that the communication packet includes the application data for the general road based on the road type identification information.

Further, the mobile station 150 installed on the vehicle 100 travelling the general road can ignore or discard the application data without read out (decrypt) the application data, when the mobile station 150 confirms that the communication packet includes the application data for the highway based on the road type identification information, even when the mobile station 150 confirms that the transmission source of the received communication packet is the base station 200 (and confirm that the destination of the communication packet is the mobile station 150). In this case, the mobile station 150 can avoid occurrence of processing load due to reading out of the application data.

In the present embodiment, the road type identification information may include first information indicating whether or not the type of the road corresponding to the application data included in the communication packet is the general road. The first information may be a one-bit flag which is set to "1" when the type of the road corresponding to the application data included in the communication packet is the general road and "0" otherwise. When the first information is set to "0", a road other than the general road and highway is included.

The road type identification information may include second information indicating whether or not the type of the road corresponding to the application data included in the communication packet is the highway. The second information may be a one-bit flag which is set to "1" when the type of the road corresponding to the application data included in the communication packet is highway and "0" otherwise. When the second information is set to "0", a road other than the general road and highway is included.

The road type identification information may be information that can take three patterns whether the type of the road corresponding to the application data included in the communication packet is 1) the general road, 2) the highway, or 3) otherwise. In this case, the road type identification information is configured by two-bits at least. Regarding to the otherwise "3", there is a special road such as an overpass, grade separation, or the like.

Operation of Base Station and Mobile Station

Figure 9:
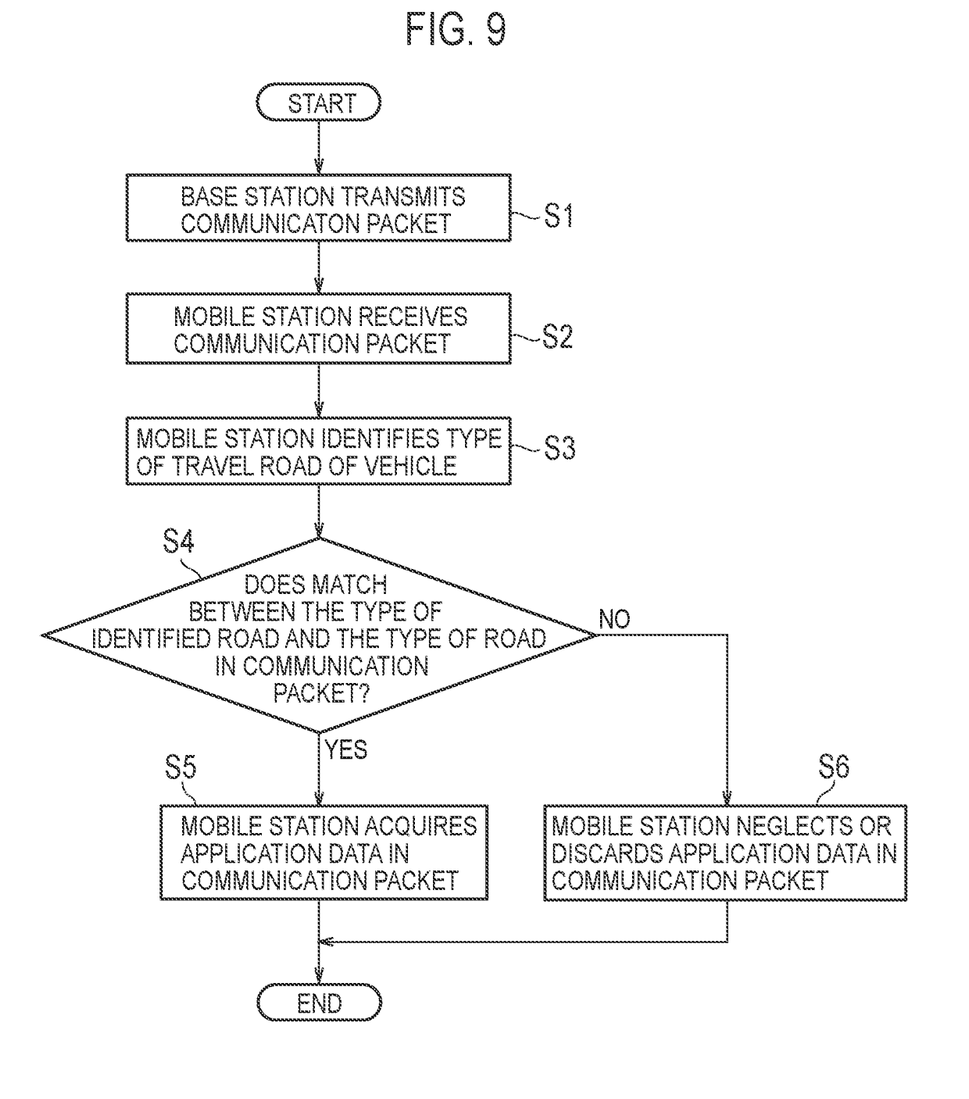
FIG. 9 is a diagram illustrating an operation example of a base station and mobile station according to an embodiment.

FIG. 9 is a diagram illustrating operation of the base station 200 and mobile station 150 according to the present embodiment.

As illustrated in FIG. 9, in Step S1, the controller 230 of the base station 200 generates the communication packet illustrated in FIG. 8 from application data.

When the base station 200 is provided at a roadside of a general road, the application data is information for the general road, for example, information regarding to a traffic signal, information regarding to a crossing, or the like. When the base station 200 is provided at the roadside of the general road, the application data is the information for the general road, for example, the information regarding to the traffic signal, the information regarding to the crossing, or the like.

The controller 230 of the base station 200 adds road type identification information indicating a type of the road of which the base station 230 is provided at the roadside to a predetermined control field of the communication packet. The predetermined control field is a PHY header, MAC control field, LLC control field, IR control field, L7 header, or security management header.

The transmitter 212 of the base station 200 transmits the communication packet generated by the controller 230 by radio.

In Step S2, the receiver 111 of the mobile station 150 receives the communication packet.

In Step S3, the controller 120 of the mobile station 150 specifies a type of a travel road of the vehicle 100 on which the controller 120 is provided. The controller 120 of the mobile station 150 may specify the type of the travel road of the vehicle 100 on which the controller 120 is provided, by inquiring travel road type to the vehicle side controller 130.

Or, the controller 120 of the mobile station 150 may specify the type of the travel road in a period from entering to exiting of the highway as the highway and specify the type of the travel road in a period of otherwise as the general road, based on highway entering information obtained from a roadside apparatus (base station 200) just before switching from the general road to the highway and highway exiting information obtained from the roadside apparatus (base station 200) just before switching from the highway to the general road.

Or, the controller 120 of the mobile station 150 may specify the type of the travel road in the period from the entering to the exiting of the highway as the highway, based on highway entering information obtained from a tollgate (base station 200) of entrance of the highway and highway exiting information obtained from a tollgate (base station 200) of exit of the highway.

Similarly, in a case where the road is a special road such as an overpass, grade separation, or the like, a roadside apparatus is provided at an its starting point and ending point, and the controller 120 of the mobile station 150 may specify the type of the travel road in a period from entering to exiting of the special road as the special road, based on special road entering information obtained from the roadside apparatus (base station 200) just before switching from the general road to the special road and special road exiting information obtained from the roadside apparatus (base station 200) just before switching from the special road to the general road.

For example, the controller 120 of the mobile station 150 may specify the type of the travel road based on map information obtained from the car navigation system 170 and latitude and longitude information obtained from the GPS receiver 160. Thereby, it is possible to specify whether the type of travel road is the general road or the highway, even when the general road and highway are provided with both to a horizontal direction (left and right directions against to vehicle travelling direction).

The controller 120 of the mobile station 150 may specify the type of the travel road based on the map information obtained from the car navigation system 170 and altitude information obtained from the GPS receiving device 160. Thereby, it is possible to specify whether the type of the travel road is the general road or the highway, even when the general road and highway are provided with both to a vertical direction (upper and lower directions).

The controller 120 of the mobile station 150 may specify the type of the travel road based on vehicle speed information obtained from the measurement device 180. For example, when the vehicle speed exceeds a threshold value in a predetermined period, the controller 120 may specify that the vehicle is travelling the highway.

The controller 120 of the mobile station 150 may specify whether the type of the travel road is the general road or the highway, by analyzing image information obtained by imaging ahead of travel direction of the vehicle 100.

In Step S4, the controller 120 of the mobile station 150 acquires the road type identification information included in the predetermined control field of the received communication packet by the receiver 111, and compares a type of the travel road indicated by the road type identification information with the type of the travel road specified by Step S3.

When the type of the travel road indicated by the road type identification information and the type of the travel road specified by Step S3 match (Step S4: YES), in Step S5, the controller 120 of the mobile station 120 acquires the application data included in in the communication packet received by the receiver 111.

On the other hand, when the type of the travel road indicated by the road type identification information and the type of the travel road specified by Step S3 does not match (Step S4: NO), in Step S6, the controller 120 of the mobile station 150 ignore or discard the application data included in the received communication packet by the receiver 111.

Other Embodiments

In the above embodiments, though the general road and highway as the type of road are exemplified, the type of the road is not be limited to the general road and highway. For example, the type of road may be more subdivided.

In the above embodiments, though it is described about the example that the base station 200 provided at the roadside is a base station of integration type of an antenna and body, the base station 200 may be a base station of separation type of the antenna and body. In this case, an antenna part of the base station 200 may be provided around the road, a body part of the base station 200 may be provided apart from the road, and the antenna part and body part may be connected via a cable.

Though it is described about a format conforming to the ARIB T109 as the communication protocol of the embodiments of the above system, the communication protocol may conform to V2X of 3GPP, or may be a scheme of wireless RAN or the like. The base station 200 may be configured by all-in-one possible to correspond all these communication standards. In a case of the V2X of 3GPP, broadcast may be an MBMS (Multimedia Broadcast Multicast Service). For example, a single cell Point-to-Multipoint (SCPTM) transmission realizing an MBMS technology is available.

Though it is described with reference to the drawings about the embodiments in details, concrete configuration is not limited to the above, various design changes or the like are possible without deviating from the gist of the invention.

This application claims priority to Japanese Patent Application No. 2018-122517 (filed on Jun. 27, 2018), which is incorporated by reference herein in their entity.

The invention claimed is:

1. A radio communication system comprising:
   a base station provided around a road; and
   a mobile station which is provided on a vehicle and performs radio communication with the base station, wherein
   the base station includes a transmitter configured to broadcast a communication packet including application data regarding to the road, and the communication packet includes identification information indicating a first type of the road corresponding to the application data, and
   the mobile station includes:
   a receiver configured to receive the communication packet from the base station, and
   a controller configured to specify a second type of the road on which the vehicle provided the mobile station travels, and
   the controller is configured to
      determine whether the first type of the road indicated by the identification information matches the specified second type of the road match,
      in response to determining that the first type of the road matches the specified second type of the road, acquire the application data included in the received communication packet, and
      the communication packet includes a predetermined frame for storing the application data and a control field before the predetermined frame, and the first type of the road indicated by the identification information is provided in the control field.

2. The radio communication system according to claim 1, wherein
   the controller is configured to ignore or discard the application data included in the received communication packet, when the first type of the road indicated by the identification information included in the received communication packet and the specified second type of the road does not match.

3. The radio communication system according to claim 1, wherein
   the identification information includes information indicating whether or not the first type of the road corresponding to the application data is a general road.

4. The radio communication system according to claim 1, wherein
   the identification information includes information indicating whether or not the second type of the road corresponding to the application data is a highway.

5. The radio communication system according to claim 1, wherein
   the controller is further configured to read the control field before the predetermined frame, and in response to determining that the first type of the road does not match the specified second type of the road, not read the application data included in the received communication packet.

6. A base station that is provided around a road and performs communication with a mobile station installed on a vehicle, the base station comprising:
   a transmitter configured to broadcast a communication packet including application data regarding to the road, wherein
   the communication packet includes identification information indicating a first type of the road corresponding to the application data,
   the mobile station including
   a receiver configured to receive the communication packet from the base station, and
   a controller configured to specify a second type of the road on which the vehicle provided the mobile station travels, determine whether the first type of the road indicated by the identification information matches the specified second type of the road match, and in response to determining that the first type of the road matches the specified second type of the road, acquire the application data included in the received communication packet, and the communication packet includes a predetermined frame for storing the application data and a control field before the predetermined frame, and the first type of the road indicated by the identification information is provided in the control field.

7. The base station according to claim 6, wherein the controller is further configured to read the control field before the predetermined frame, and in response to determining that the first type of the road does not match the specified second type of the road, not read the application data included in the received communication packet.

8. A mobile station that is installed in a vehicle and performs communication with a base station provided around a road, the mobile station comprising:
   a receiver configured to receive a communication packet, the communication packet including application data regarding to the road is broadcasted; and
   a controller configured to specify a second type of the road on which the vehicle installed the mobile station travels, wherein the communication packet includes identification information indicating a type of the road corresponding to the application data, and the controller is configured to
   determine whether the first type of the road indicated by the identification information matches the specified second type of the road match, and
   in response to determining that the first type of the road matches the specified second type of the road, acquire the application data included in the received communication packet, and the communication packet includes a predetermined frame for storing the application data and a control field before the predetermined frame, and the first type of the road indicated by the identification information is provided in the control field.

9. The mobile station according to claim 8, wherein the controller is further configured to read the control field before the predetermined frame, and in response to determining that the first type of the road does not match the specified second type of the road, not read the application data included in the received communication packet.

\* \* \* \* \*